March 14, 1933.  W. J. LUCAS  1,901,312
PISTON CONSTRUCTION
Filed March 30, 1932    2 Sheets-Sheet 1
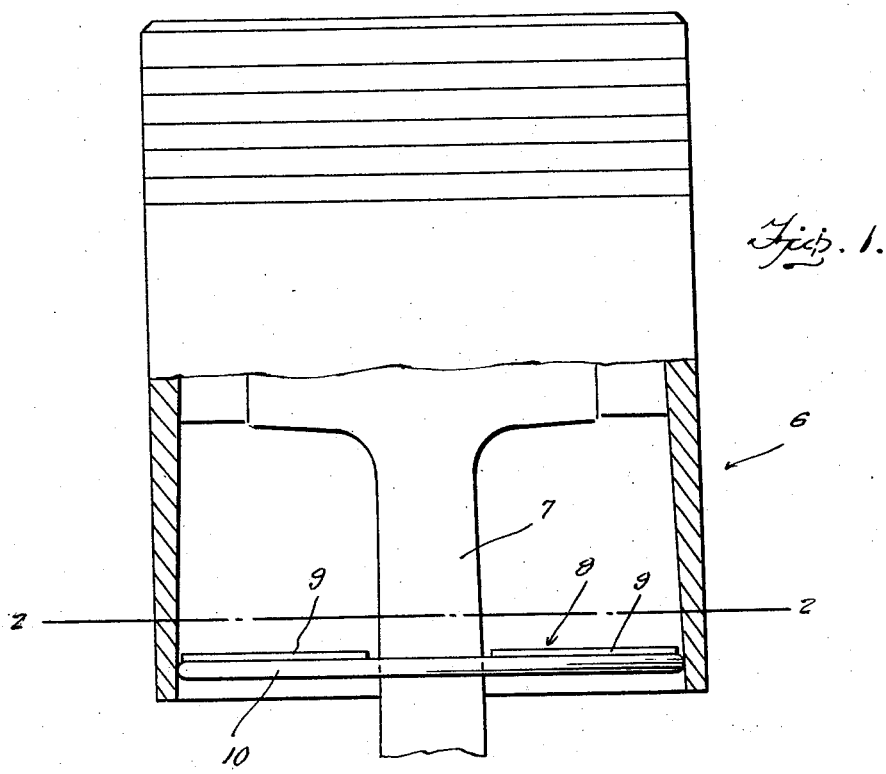
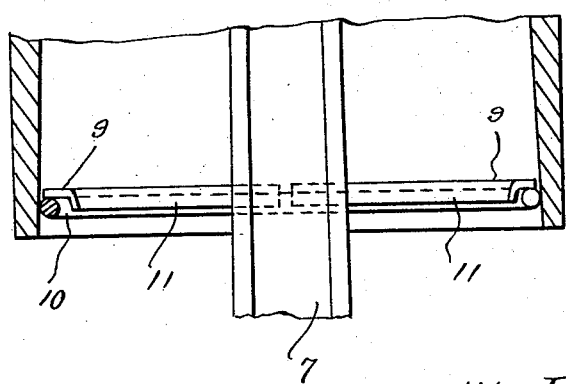
Inventor
*W. J. Lucas*
By *Clarence A. O'Brien*
*Attorney*

March 14, 1933.  W. J. LUCAS  1,901,312
PISTON CONSTRUCTION
Filed March 30, 1932   2 Sheets-Sheet 2
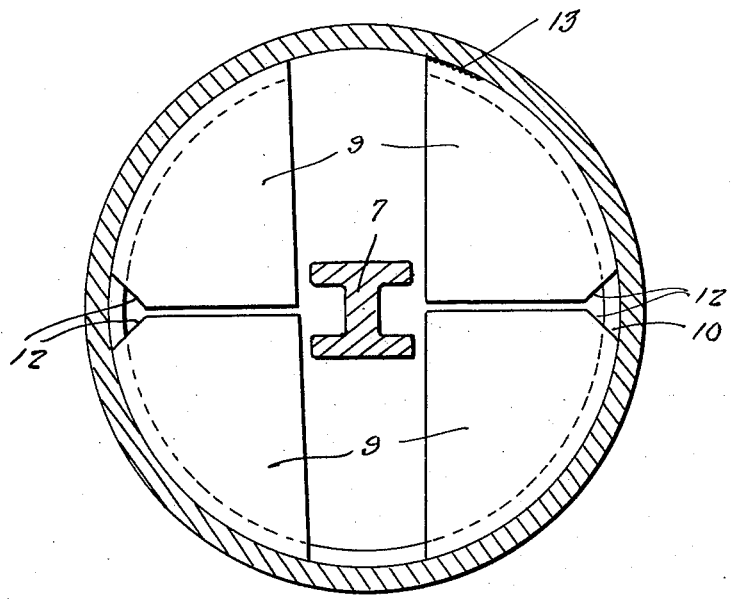
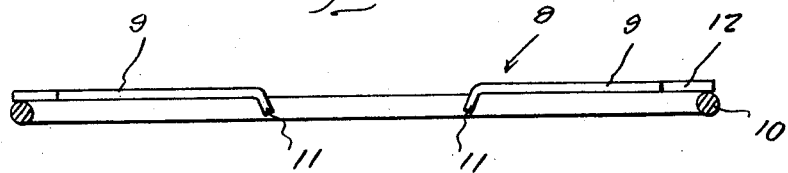
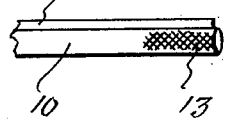
Inventor
W. J. Lucas
By Clarence A. O'Brien
Attorney Patented Mar. 14, 1933

1,901,312

UNITED STATES PATENT OFFICE

WILLIAM J. LUCAS, OF OKLAHOMA CITY, OKLAHOMA

PISTON CONSTRUCTION

Application filed March 30, 1932. Serial No. 602,063.

The invention relates to an improved piston for use in connection with present day types of internal combustion engines, and the improvement has to do with a supplemental accessory designed to conserve lubricating oil.

The invention is especially but not necessarily adapted for use in an aluminum alloy split skirt piston whether it be of the invar-strut or non-strut type.

Oil leakage between the pistons and the wall of the cylinder is not uncommon. In fact all sorts of oil rings and appurtenances have been utilized with the thought in mind of preventing the escape of lubricating oil into the combustion chamber of the motor. Moreover the lower edge of the skirt of the piston has been thinned to a feather-like edge to scrape and skim the oil film from the cylinder wall, but in spite of these precautionary measures leakage nevertheless occurs, not only interfering with the efficiency of the motor but unnecessarily consuming the oil which might otherwise be conserved and used to greater advantage for lubricaing purposes.

The purpose of the present invention is to provide means on the interior of the shell of the piston to intercept the oil and cause it to gravitate back to the surfaces requiring lubrication and at the same time prevent oil from being splashed or carried upwardly into the interior of the piston by the action of a connecting rod so that it will be prevented from finding its way outwardly through the apertures in the piston and finally into the combustion chamber.

In the accompanying drawings, in which like numerals are employed to designate like parts throughout the views:

Figure 1 is a view in section end elevation illustrating the preferred embodiment of the invention.

Figure 2 is a horizontal section on the line 2—2 of Figure 1.

Figure 3 is a fragmentary vertical sectional end elevational view.

Figure 4 is a detail sectional end elevational view of the novel additional feature of the piston.

Figure 5 is a detail view.

Briefly and broadly stated, the inventive conception comprehends the installation of means on the interior of the piston, preferably near the bottom of the skirt, to function as a baffle and thereby intercept the excessive flow or passage of oil upwardly through the piston whereby to conserve the oil and at the same time prevent escapement thereof into the combustion chamber.

Referring now to the drawings by distinguishing reference characters it will be observed that the piston is generally designated by the numeral 6 and is of conventional type. The connecting rod is indicated at 7 and the improved oil intercepting means is denoted by the numeral 8. This means is preferably located in the lower skirt portion of the shelf of the piston and seems to be more effective when located at the bottom of the skirt but may be positioned further up in the skirt if conditions warrant this change in position.

As before implied the device 8 is preferably in the form of a baffle. The most practical arrangement I have discovered is the type illustrated in the drawings wherein it will be observed that the baffle, collectively considered, practically functions as a partition, the same being composed of four duplicate segmental wings or plates 9 spaced apart from each other and having their outer marginal portions welded or otherwise rigidly secured to a retaining ring 10. The inner opposed parallel edges of the plate are bent down as indicated at 11 to form guard lips. The adjacent corner portions of the respective pairs or step plates are cut away as indicated at the point 12 to allow for adequate radial expansion and contraction of the ring 12. The ring is of appropriate tensile strength and its ends are split so that it will fit adjustably in different sized pistons. Under this arrangement when the device is put in place sufficient clearance is left between the plates 9 to accommodate the action of a connecting rod 7. Moreover one or both ends of the ring are knurled or roughened as at 13 to provide for secure anchorage of the device in place when it is once put in position. The device may be shifted bodily up or down in a skirt of the piston so that it may assume the most effective baffling position to counteract the excessive upward throw and casting of oil into the interior of the piston.

When the device is installed in the vertically split pipe of aluminum alloy piston it exerts sufficient circumferential and radial pressure against the skirt as to expand the skirt into intimate contact with the wall of the cylinder (not shown).

The gist of the invention is in the provision of internal means susceptible of being built in the original piston construction or applied as an attachment or accessory wherein said means is constructed to serve as a baffle to intercept the upward passage of lubricating oil whereby to check the oil flow at a point which appears to be more efficient than attempting to check the flow of oil between the piston and its cylinder wall through the medium of elaborate oil rings and the like.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:

1. As a new article of manufacture, a split radially expansible resilient ring having one end knurled for anchorage purposes, a plurality of segmental plates having their outer peripheral edge portions attached to said ring, said plates being spaced apart to facilitate expansion and contraction of the ring.

2. In a structure of the class described, in combination, a hollow piston, a connecting rod operatively connected to said piston, a split radially expansible and contractible resilient ring adapted to be removably fitted in said piston, a plurality of companion plates of general segmental configuration having their outer edge portions attached to said ring, said plates being disposed in a horizontal plane and substantially even with each other, the inner edge portions of the plates adjacent to said connecting rod being spaced from each other and formed with down-bent edge portions defining guard lips.

In testimony whereof I affix my signature.

WILLIAM J. LUCAS.